(12) United States Patent
Tenmyo

(10) Patent No.: US 6,575,582 B2
(45) Date of Patent: Jun. 10, 2003

(54) ILLUMINATION DEVICE

(75) Inventor: Yoshiharu Tenmyo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/808,560

(22) Filed: Mar. 14, 2001

(65) Prior Publication Data

US 2001/0028559 A1 Oct. 11, 2001

(30) Foreign Application Priority Data

Mar. 16, 2000 (JP) .......................................... 2000-074557

(51) Int. Cl.[7] .............................................. G03B 15/02
(52) U.S. Cl. .............................. 362/16; 362/3; 362/309; 362/327
(58) Field of Search .............................. 362/16, 3, 327, 362/329, 309, 335, 336, 308, 331; 359/633, 726, 709

(56) References Cited

U.S. PATENT DOCUMENTS 2,137,079 A * 11/1938 Falge ......................... 362/309
2,356,654 A * 8/1944 Cullman ..................... 362/327
5,813,743 A * 9/1998 Naka ........................... 362/16

* cited by examiner

Primary Examiner—Sandra O'Shea
Assistant Examiner—Bao Q. Truong
(74) Attorney, Agent, or Firm—Robin, Blecker & Daley

(57) ABSTRACT

An illumination device or a flash device of a camera includes a light source, a first optical unit and a second optical unit. The first optical unit is arranged to direct light from the light source to an object, and has a lens part disposed a middle portion of the first optical unit and having such an optical power that each of both lens surfaces thereof has a positive refractive power to cause diverging light from the light source to exit in a light-collected state, and reflective surfaces disposed on both sides of the lens part and arranged to reflect light from the light source toward the object. The second optical unit is disposed on a side nearer to the object than the first optical unit and having a plurality of lens parts. An illumination angle is varied by varying a relative interval between the first optical unit and the second optical unit.

19 Claims, 11 Drawing Sheets

ILLUMINATION DEVICE

BACKGROUND OF THE INVENTION

1. Field of the Invention

The present invention relates to an illumination device capable of varying an illumination angle thereof, and to a photographing apparatus using the illumination device.

2. Description of Related Art

There have heretofore been known a variety of kinds of technical art concerning an illumination device for use with a photographing apparatus, such as a camera, so as to efficiently collect light fluxes emitted in various directions from a light source into a necessary illumination range (an angle of view required to be illuminated). In particular, in recent years, there has been known an illumination device in which an optical member utilizing total reflection, such as a prism or a light guide, is disposed in place of a Fresnel lens, which would conventionally be disposed in front of a light source, for the purpose of improving the efficiency of light collection and reducing the size of the illumination device.

On the other hand, in an illumination device of the fixed illumination range type, when a photographing apparatus having a high-magnification zoom ratio is in a telephoto state, in which the required illumination range is narrow, an unnecessary range would be illuminated, thereby causing large loss of energy. In order to solve such a phenomenon, there have been known a variety of variable-illumination-angle illumination devices capable of performing illumination corresponding to a photographing range.

As illumination devices adopting the above-mentioned two kinds of technical art, there have been known, as disclosed in Japanese Laid-Open Patent Application No. Hei 4-138439, an illumination device in which an optical prism arranged to perform total reflection is used as a light-collecting optical system and the positional relationship between the optical prism and a light source is relatively varied to change the total-reflection surface between reflection and transmission so as to vary the illumination range. Further, as disclosed in Japanese Laid-Open Patent Application No. Hei 8-262538, there has been known an illumination device in which an optical prism is divided into a plurality of prism members and the prism members disposed on the upper and lower sides are rotated to change over the illumination range.

In recent years, in the case of photographing apparatuses, such as cameras, the reduction in size and weight of the apparatus itself has advanced, and, on the other hand, a photographic lens shows a tendency to have a high-magnification zoom ratio. In general, such a reduction in size of the photographing apparatus and such a high-magnification zoom ratio of the photographic lens cause the photographic lens to tend to gradually become dark. If a photograph is taken without using any auxiliary light source, there is a possibility that the photograph becomes an unexpected failure due to the camera shake.

In order to resolve such a situation, normally, an illumination device (flash device) serving as an auxiliary light source is incorporated in most photographing apparatuses, such as cameras. Then, owing to the above-mentioned situation, the frequency of use of the illumination device increases greatly as compared with cases in the past, and the amount of light emission required for one photo-taking operation tends to increase.

Such being the background, in the case of the flash light emitting device (illumination device) disclosed in the above Japanese Laid-Open Patent Application No. Hei 4-138439, the optical prism, serving as a light-collecting optical system, is an optical member composed of upper and lower surfaces arranged to cause, mainly, light fluxes emitted sideward from the light source and entering the optical member to be totally reflected so as to be collected in a predetermined direction, and a front surface formed separately from the upper and lower surfaces and having a positive refractive power to collect light fluxes, and is arranged to cause the light fluxes collected by the respective surfaces to exit from one and the same exit surface toward an object side. Then, the positional relationship between the optical prism and the light source is relatively varied to change the total-reflection surfaces between reflection and transmission so as to vary the illumination range. However, there remain such problems difficult in design that, because of large limitations of the surface shape for change-over between total reflection and transmission to vary the illumination angle accurately, the degree of freedom of designing the shape of the optical prism is small, the loss in amount of light for transmitted light components entering and exiting from the optical prism becomes large, and the magnitude of an effective light emitting part of the light source has a considerable influence on the light distribution.

On the other hand, in the case of the illumination device disclosed in the above Japanese Laid-Open Patent Application No. Hei 8-262538, the optical prism is divided into a plurality of prism members and the prism members disposed on the upper and lower sides are rotated to change over the illumination range. However, since such a rotation of the prism members essentially causes only illumination directions of total-reflection light components to shift as a whole and does not vary the light distribution characteristic itself, it is not always possible to obtain the even light distribution in every zoom point. More specifically, in the method of widening the illumination range, from the most light-collecting state, which is brought about when three illumination areas, i.e., the upper, lower and middle areas, overlap one another, the prism members are rotated to cause the light distributions of the upper and lower illumination areas to gradually shift outward. In such a process of varying the illumination range, there occurs a discontinuous point in the overlapping portion of the light distributions of the upper, lower and middle areas, so that it is not necessarily possible to obtain the even light distribution over the entire illumination range and there exist points where the illuminance becomes uneven in part. Further, since three, i.e., upper, lower and middle, optical prism members are required and the two optical prism members have to be moved in synchronism with each other, the arrangement of mechanical parts of the illumination device becomes complicated, disadvantageously causing an increase in cost.

Further, as the related art of the invention, there are, for example, U.S. patent application Ser. No. 09/644,701 filed on Aug. 24, 2000 now U.S. Pat. No. 6,400,905, Japanese Laid-Open Patent Application No. Hei 4-275537, U.S. patent application Ser. No. 09/454,452 filed on Dec. 6, 1999, U.S. patent application Ser. No. 08/581,333 filed on Dec. 29, 1995, etc.

BRIEF SUMMARY OF THE INVENTION

It is an object of the invention to reduce the size of the entire shape of an illumination optical system capable of varying the illumination angle.

It is another object of the invention to make the light distribution characteristic of the illumination optical system even in every zoom point and to decrease the amount of movement required for varying the illumination angle.

It is a further object of the invention to reduce the number of constituent parts of the illumination optical system, thereby causing a reduction in cost.

It is a still further object of the invention to provide a variable-illumination-angle illumination device which is reduced in size, thickness and weight.

It is a still further object of the invention to provide an illumination device, adapted for a still camera, a video camera, etc., arranged to be capable of utilizing energy obtained from a light source with high efficiency and of obtaining the even light distribution characteristic in every zoom point, and having the simple and inexpensive construction, and to provide a photographing apparatus using the illumination device.

To attain the above objects, in accordance with an aspect of the invention, there is provided an illumination device, comprising a light source, and a first optical unit arranged to direct light from the light source to an object, wherein the first optical unit has a lens part disposed a middle portion of the first optical unit and having such an optical power that each of both lens surfaces thereof has a positive refractive power to cause diverging light from the light source to exit in a light-collected state, and reflective surfaces disposed on both sides of the lens part and arranged to reflect light from the light source toward the object.

In the illumination device, the first optical unit further has exit surfaces disposed on both sides of the lens part and arranged to cause the light reflected by the reflective surfaces to exit, the light caused to exit being in the light-collected state.

In addition, the illumination device further comprises a second optical unit having a plurality of positive lens parts of positive refractive power corresponding respectively to light fluxes exiting from the lens part and the reflective surfaces.

In addition, in the illumination device, an illumination angle is varied by varying a relative interval between the first optical unit and the second optical unit.

In addition, in the illumination device, the light source is a discharge tube of cylindrical form.

In addition, the illumination device further comprises a reflector disposed on a side of the discharge tube opposite to the object and arranged to return light emitted from the discharge tube toward a light-emitting source of the discharge tube.

In addition, in the illumination device, the first optical unit is lengthwise in a longitudinal direction of the discharge tube.

In addition, in the illumination device, the lens part of the first optical unit is of cylindrical form.

In addition, in the illumination device, each of the reflective surfaces is arranged to totally reflect light.

In addition, the illumination device is mounted on a camera.

Further, to attain the above objects, in accordance with another aspect of the invention, there is provided an illumination device, comprising a light source, a first optical unit arranged to direct light from the light source to an object, wherein the first optical unit has a lens part disposed a middle portion of the first optical unit and having such an optical power that each of both lens surfaces thereof has a positive refractive power to cause diverging light from the light source to exit in a light-collected state, and reflective surfaces disposed on both sides of the lens part and arranged to reflect light from the light source toward the object, and a second optical unit disposed on a side nearer to the object than the first optical unit and having a plurality of lens parts.

The above and further objects and features of the invention will become apparent from the following detailed description of preferred embodiments thereof taken in conjunction with the accompanying drawings.

DETAILED DESCRIPTION OF THE INVENTION

Hereinafter, preferred embodiments of the invention will be described in detail with reference to the drawings.

First Embodiment

Figure 1:
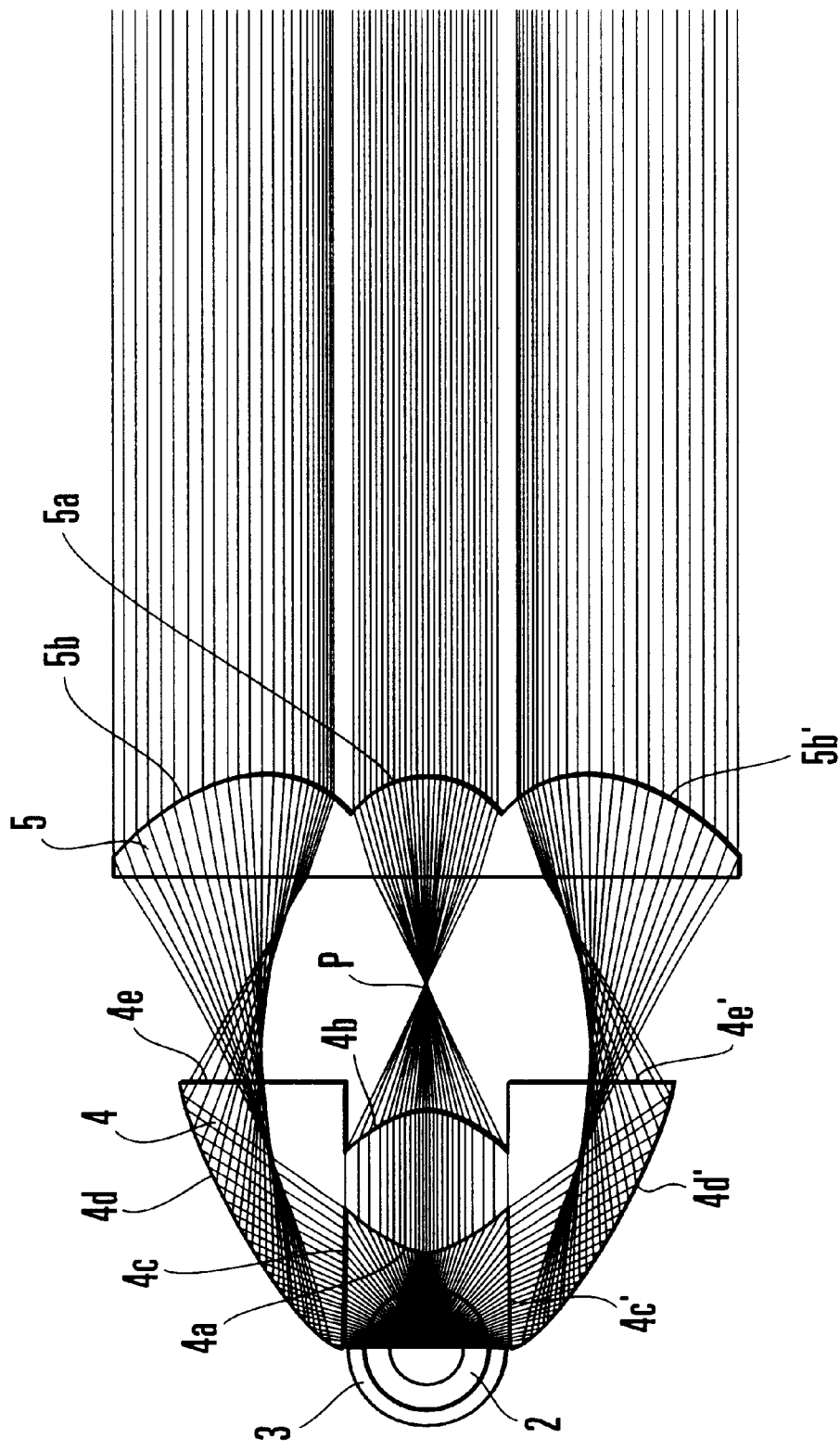
FIG. 1 is a vertical sectional view showing a flash light emitting device in a radial direction of a discharge tube when being set correspondingly with a narrow illumination range, according to a first embodiment of the invention.
Figure 2:
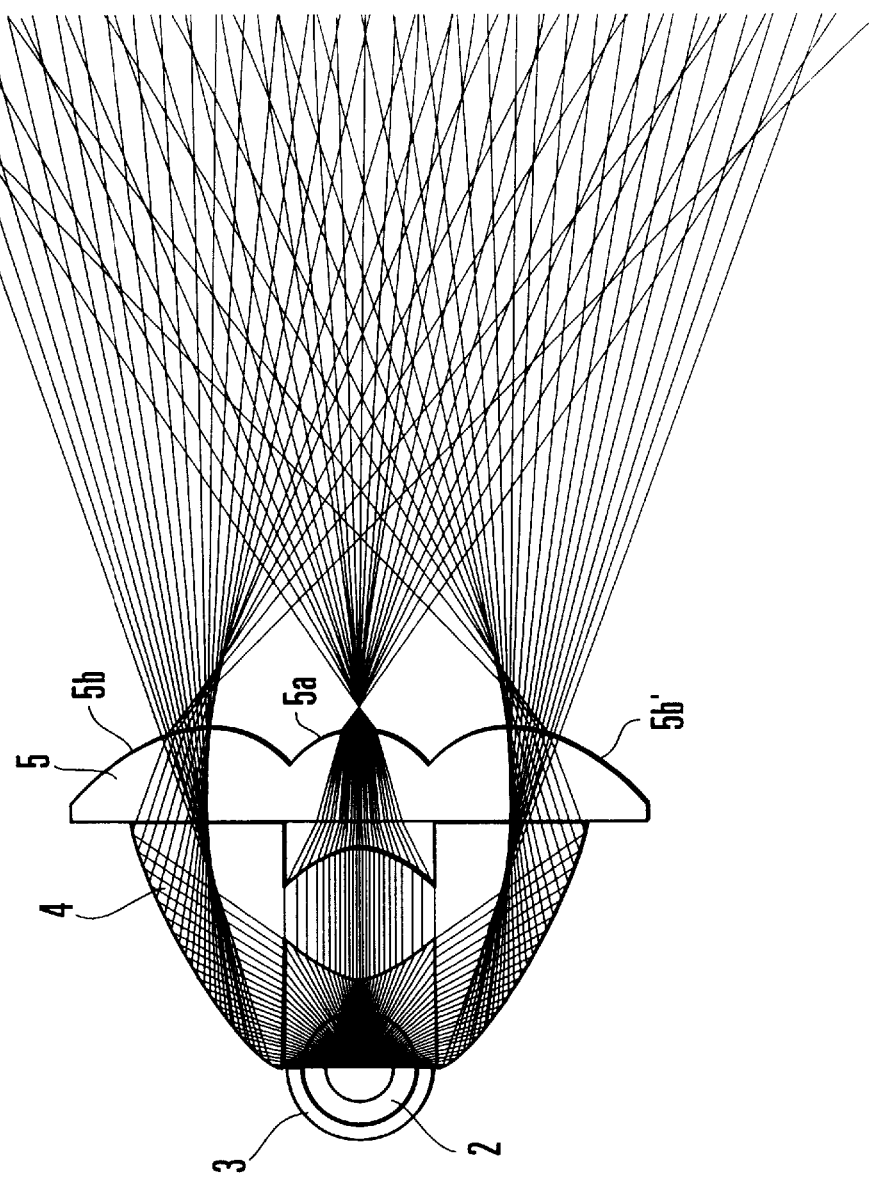
FIG. 2 is a vertical sectional view showing the flash light emitting device in the radial direction of the discharge tube when being set correspondingly with a wide illumination range, according to the first embodiment of the invention.
Figure 3:
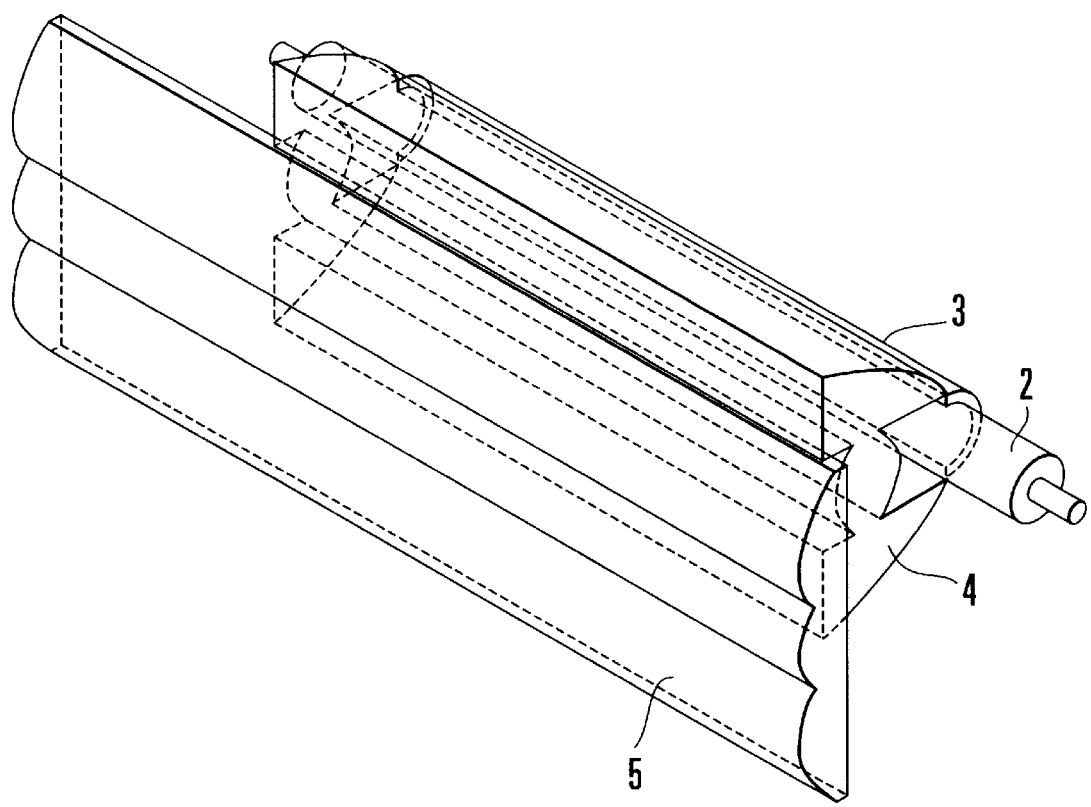
FIG. 3 is a perspective view showing essential parts of an optical system of the flash light emitting device according to the first embodiment of the invention.
Figure 4:
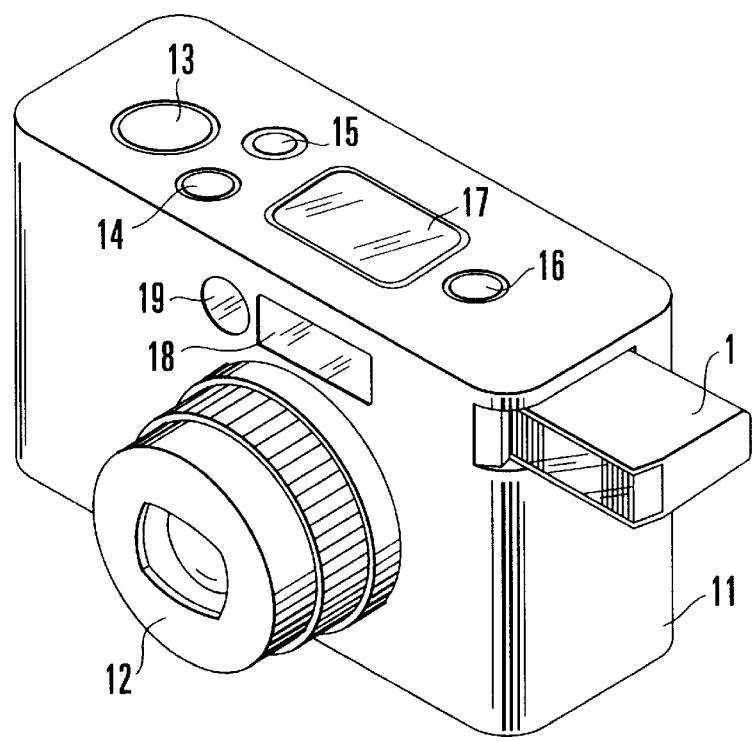
FIG. 4 is a perspective view showing a camera to which the flash light emitting device according to the first embodiment of the invention is applied.
Figure 5:
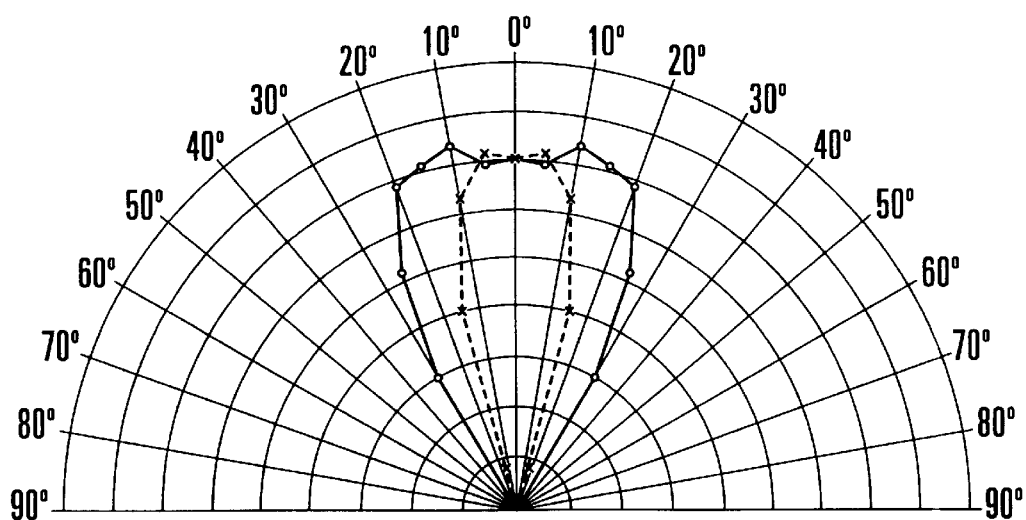
FIG. 5 is a diagram for explaining the light distribution characteristic of the flash light emitting device according to the first embodiment of the invention.

FIGS. 1 to 4 show a variable-illumination-angle illumination device, in particular, a flash light emitting device, according to a first embodiment of the invention. FIGS. 1 and 2 are vertical sectional views of essential parts constituting an optical system of the flash light emitting device. FIG. 3 is a perspective view showing only the essential parts of the optical system of the flash light emitting device. FIG. 4 is a perspective view showing a camera to which the flash light emitting device according to the first embodiment is applied. FIG. 5 shows, by way of example, the light distribution characteristic obtained by the flash light emitting device according to the first embodiment. Further, in FIGS. 1 and 2, ray tracing diagrams for rays emitted from the center of a light source are also illustrated.

As shown in FIG. 4, the flash light emitting device according to the first embodiment is disposed on the upper portion of the camera body, and is arranged to protrude from one side of the camera body when the camera is being used.

In FIG. 4, there are illustrated a flash light emitting part 1, a photographing apparatus body (camera body) 11, a lens barrel 12 having a photographic lens, a release button 13, a telephotoward zooming button 14, a wide-angleward zooming button 15, an operation button 16 for changing over the various modes of the camera, a liquid crystal display window 17 for informing the user of an operating state of the camera, an observation window 18 of a light measuring device for measuring the brightness of external light, and an observation window 19 of a viewfinder.

Since the function of each of the members other than the flash light emitting part 1 is known in the art, the detailed description of the members other than the flash light emitting part 1 is omitted here. Incidentally, the mechanical constituent elements of the invention are not limited to those mentioned in the foregoing.

Next, the constituent elements which define the optical characteristic of the flash light emitting element 1 will be described in more detail with reference to FIG. 3. In FIG. 3, reference numeral 2 denotes a flash discharge tube (xenon tube) of cylindrical form for emitting flash light.

Reference numeral 3 denotes a reflector arranged to reflect, in a light-exiting direction, components emitted rearward relative to the light-exiting direction among light fluxes emitted from the flash discharge tube 2. The reflector 3 has an inner surface made of metal material, such as glossy aluminum, of high reflectance, or has a metal-evaporated surface of high reflectance formed on an inner surface thereof.

Reference numeral 4 denotes a first light-transmissive optical member arranged to divide light fluxes emitted from the flash discharge tube 2 into several optical paths, to cause the light fluxes located in the respective areas to exit from exit surfaces, and to, after that, cause the light fluxes to intersect at predetermined positions, thereby obtaining the light distribution characteristic showing the predetermined extent.

Reference numeral 5 denotes a second light-transmissive optical member arranged to allow the light fluxes exiting from the first light-transmissive optical member 4 to enter the second light-transmissive optical member 5 and to, then, convert the light fluxes in such a way as to have the predetermined distribution characteristic as required. The second light-transmissive optical member 5 has a plurality of cylindrical lenses formed on the side of the exit surfaces thereof.

With the flash light emitting part 1 arranged as described above, the flash discharge tube 2, the reflector 3 and the first light-transmissive optical member 4 are integrally held by a holding case or the like, and the separation between the first light-transmissive optical member 4 and the second light-transmissive optical member 5 can be varied to continuously vary the degree of light collection.

Incidentally, each of the first light-transmissive optical member 4 and the second light-transmissive optical member 5 is made of optical plastic material of high transmittance, such as acrylic resin, or glass material.

In the photographing apparatus body 11, as in the conventional technical art, when the camera is set to, for example, an "automatic flash mode", after the release button 13 is depressed by the user, a central processing unit (not shown) incorporated in the camera decides whether to cause the flash light emitting device to make light emission, on the basis of the brightness of external light measured by the light measuring device (not shown) and the sensitivity of film loaded in the camera.

When, under a photographing condition, the central processing unit decides to cause the flash light emitting device to make light emission, the central processing unit outputs a light emission signal to cause the flash discharge tube 2, via a trigger lead line connected to the reflector 3, to emit light fluxes. Among the light fluxes emitted from the flash discharge tube 2, light fluxes emitted in a direction opposite to an illumination optical axis pass via the reflector 3 and light fluxes emitted in the illumination optical axis pass directly through the first light-transmissive optical member 4 and the second light-transmissive optical member 5, which are disposed in front of the flash discharge tube 2, so as to be converted into light fluxes having the predetermined light distribution characteristic for illuminating the object. In the first embodiment, the variation of the light distribution characteristic is effected only by the minute relative movement between the first light-transmissive optical member 4 and the second light-transmissive optical member 5.

In the illumination device according to the present embodiment, in particular, in a case where the photographic lens of the photographing apparatus is a zoom lens, the light distribution characteristic mainly in the vertical direction is made to correspond to the photographic lens by varying the positional relationship between the first light-transmissive optical member 4 and the second light-transmissive optical member 5 according to the focal length of the zoom lens.

FIGS. 1 and 2 are vertical sectional views showing the flash light emitting device in a radial direction of the flash discharge tube, according to the first embodiment of the invention, and are diagrams for explaining the basic concept of the variable illumination angle of the flash light emitting device according to the invention. The reference numerals of the respective members shown in FIGS. 1 and 2 correspond to those shown in FIG. 3. FIG. 1 shows a state in which the first light-transmissive optical member 4 and the second light-transmissive optical member 5 are located away from each other at a predetermined distance. On the other hand, FIG. 2 shows a state in which the first light-transmissive optical member 4 and the second light-transmissive optical member 5 are located closest to each other. Further, in the first embodiment, which will be described here, it is possible to continuously vary the illumination range while keeping the light distribution characteristic in the vertical direction even, and the height of an aperture in the vertical direction is set to the necessary and minimum value.

First, the characteristic shape of the optical system of the flash light emitting device having the above-mentioned construction will be described in order. The reflector 3 is lengthwise in a longitudinal direction of the flash discharge tube 2 and is of the semicylindrical form approximately concentric with the flash discharge tube 2. This form is effective for returning reflection light from the reflector 3 to the central portion or thereabout of the light source (the flash discharge tube 2), makes the adverse effect of the refraction of glass of the flash discharge tube 2 hardly exerted, and makes it possible to reduce the size of the whole optical system following the flash discharge tube 2, because reflection light from the reflector 3 can be regarded as light emitted from approximately the same point as the point from which direct light from the light source is emitted. Further, the reason why the form of the reflector 3 is just semicylindrical is that, if the reflector 3 is made smaller than the semicylindrical form, the size of the whole optical system is disadvantageously caused to increase so as to collect sideward light, and, if, on the other hand, the reflector 3 is made larger than the semicylindrical form, light fluxes confined in the inside of the reflector 3 increase, thereby disadvantageously lowering the illumination efficiency.

The first light-transmissive optical member 4 is set to have the following form in the case of the first embodiment. First, at the middle portion of the first light-transmissive optical member 4, a cylindrical lens surface having a positive refractive power is formed on each of an entrance surface 4a and an exit surface 4b. Thus, the form of the middle portion of the first light-transmissive optical member 4 is set such that light fluxes emitted from the center of the light source are collected to the position of a point P in a straight-line fashion in a direction perpendicular to the drawing plane of FIG. 1. Further, at the upper and lower portions of the first light-transmissive optical member 4, light fluxes emitted from the center of the light source are refracted by entrance surfaces 4c and 4c', are then reflected by reflective surfaces 4d and 4d', and are then caused to exit from exit surfaces 4e and 4e'. In this instance, the form of each of the reflective surfaces 4d and 4d' is set such that, as shown in FIG. 1, a ray reflected at the upper portion of the reflective surface 4d is led in the downward direction, a ray reflected at the middle portion of the reflective surface 4d is led in the direction approximately parallel with the light-exiting optical axis, and a ray reflected at the lower portion of the reflective surface 4d is led in the upward direction, and, in addition, the light fluxes after being reflected are distributed evenly.

On the other hand, the second light-transmissive optical member 5 is provided with lens surfaces 5a, 5b and 5b' each having a positive refractive power, which are formed at three areas on the exit surface side thereof. The lens surfaces 5a, 5b and 5b' are formed, as shown in FIG. 1, correspondingly with three areas of the first light-transmissive optical member 4, i.e., one light-collected area obtained by the middle lens portion of the first light-transmissive optical member 4 and two light-collected areas obtained by the upper and lower total-reflection portions of the first light-transmissive optical member 4.

In the following, the characteristic of the form of each of the first light-transmissive optical member 4 and the second light-transmissive optical member 5 and the manner of behavior of rays entering and exiting from the first light-transmissive optical member 4 and the second light-transmissive optical member 5 will be described in more detail.

In FIG. 1, there are illustrated the inner and outer diameters of a glass tube, i.e., of the flash discharge tube 2. In most of flash discharge tubes actually employed in such a kind of flash light emitting device as in the present embodiment, light is emitted from the full range of the inner diameter so as to improve the illumination efficiency.

Therefore, it may be considered that light is emitted approximately in an even manner from light-emission points of the full range of the inner diameter of the flash discharge tube. However, for the purpose of simplifying the description here, light fluxes emitted from the center of the light source are assumed to be representative light fluxes, and, in FIG. 1, there are illustrated, in particular, only light fluxes emitted from the center of the light source. In the actual light distribution characteristic, light fluxes emitted from the marginal portion of the flash discharge tube in addition to the representative light fluxes as shown in FIG. 1 cause the light distribution characteristic to change in such a direction as to somewhat widen as a whole. However, since the tendency of the light distribution characteristic is almost unvaried, the following description is made on the basis of the representative light fluxes.

First, with regard to the material of the first light-transmissive optical member 4 and the second light-transmissive optical member 5, it is most preferable to use an optical plastic material, such as acrylic resin, from the viewpoints of molding, cost and optical characteristic. However, it is necessary to set the material while taking into consideration not only the above-mentioned characteristic but also the fact that, in this kind of illumination device, a large amount of heat is generated from the light source concurrently with the generation of light. Thus, with the influence of such heat taken into consideration, it is necessary to perform the setting of the optical material and the setting of a heat-radiating space.

When considering the light-transmissive optical member having the above-mentioned form, it is each entrance surface of the light-transmissive optical member 4, which is located closest to the light source, that is actually apt to be most affected by the heat. Therefore, it is, first of all, necessary to define the minimum distance between the light source and each entrance surface. In the case of the first embodiment, spatial distances are set in such a manner as to prevent the deformation of the first light-transmissive optical member 4 with respect to a light-emission durable condition required for two places, i.e., the shortest distance between the light source and the first entrance surface 4a, which is arranged to control, directly by refraction, angular components whose emission angles from the light source are approximate to the light-exiting optical axis, and the shortest distance between the light source and the second entrance surface 4c or 4c', which is arranged to receive angular components distant from the light-exiting optical axis.

Next, the shape of each surface of the first light-transmissive optical member 4 will be described.

The lens surfaces 4a and 4b, which are arranged to control, directly by refraction, angular components approximate to the light-exiting optical axis, constitute an aspheric cylindrical lens of the form defined such that light fluxes emitted from the center of the light source are once made parallel with the light-exiting optical axis by the entrance surface 4a and are then collected to the point P by the exit surface 4b. This arrangement is made for the purpose of facilitating the setting of an optimum surface shape of the exit surface 4b by once making the light fluxes refracted by the entrance surface 4a parallel with the light-exiting optical axis.

However, the shape of the first light-transmissive optical member 4 should not necessarily be limited to such a shape as to once make the light fluxes parallel at the entrance surface 4a. As long as the shape of the first light-transmissive optical member 4 is such a shape as to approximately collect light fluxes having passed through the first light-transmissive optical member 4 to the point P or thereabout and to set the maximum light-exiting angle and the minimum light-exiting angle of the light fluxes to respective predetermined angles, the setting of a refractive power of each lens surface is not limited to a particular value. Accordingly, it goes without saying that the aspheric lens is not any necessary condition, and the combination of a spherical lens and a cylindrical lens may be used instead.

The shape of the second entrance surface 4c or 4c', which is arranged to lead incident light fluxes to the reflective surface 4d or 4d' of the first light-transmissive optical member 4, will be described below.

The second entrance surface 4c or 4c' is desirable to be a plane surface parallel with the optical axis, so as to minimize the shape of the first light-transmissive optical member 4. More specifically, components advancing in directions different from the light-exiting optical axis, among light fluxes emitted from the light source, are once refracted by the second entrance surface 4c or 4c'. Then, the smaller the angle of the second entrance surface 4c or 4c', the greater the effect of such refraction becomes. Accordingly, incident light fluxes can be once led in such directions as to go away from the optical axis, so that it is possible to shorten the total length of the optical system.

However, in actuality, the inclination of the second entrance surface 4c or 4c' is almost decided by the molding condition of the first light-transmissive optical member 4. The smaller the angle of the second entrance surface 4c or 4c', the severer the actual molding condition becomes. Then, the maximum value $\Phi$ of the angle of the second entrance surface 4c or 4c' in an ideal shape of the first light-transmissive optical member 4 is desirable to exist within the following range, irrespective of whether the second entrance surface 4c or 4c' is a plane surface or a curved surface:

$$0 \leq \Phi < 2°  \qquad (1)$$

Since the length of the second entrance surface 4c or 4c' is short and the shape of the second entrance surface 4c or 4c' is a smooth surface, it is easy to attain the above range. With the inclination of the second entrance surface 4c or 4c' defined as mentioned above, it is possible to minimize the area of an aperture in the vertical direction without causing a decrease in the illumination efficiency.

With regard to the shape of the reflective surface 4d or 4d', as mentioned in the foregoing, the reflective surface 4d or 4d' is set such that a ray reflected at the upper portion of the reflective surface 4d is led in the downward direction, a ray reflected at the middle portion of the reflective surface 4d is led in the direction approximately parallel with the light-exiting optical axis, and a ray reflected at the lower portion of the reflective surface 4d is led in the upward direction, and, in addition, the light fluxes after being reflected are distributed evenly. The reflective surface 4d or 4d' is desirable to have such a shape as to collect light fluxes to one point similarly to the lens surfaces 4a and 4b, which are arranged to control, directly by refraction, angular components approximate to the light-exiting optical axis. If this arrangement is adopted, however, the size of the first light-transmissive optical member 4 increases and the space required for varying the illumination angle increases, so that the entire shape of the optical system of the variable-illumination-angle illumination device enlarges. Further, if such an arrangement is intended to be realized without increasing the size of the optical system, it is not easy to make the illumination angles of the upper and lower portions coincident with each other, and it becomes difficult to make the light distribution characteristics of the upper and lower portions even. Therefore, in the first embodiment, the shape of the reflective surface 4d or 4d' is decided in such a way as to have the effect approximately equivalent to the above-mentioned one-point light-collection. With the reflective surface 4d or 4d' having such a shape, although in a false manner, it becomes possible to realize the effect approximately equivalent to the manner of the surface construction of the lens surfaces 4a and 4b.

On the other hand, light fluxes advancing toward the reflector 3, among light fluxes emitted from the flash discharge tube 2, are reflected by the reflector 3, are then caused to again enter the flash discharge tube 2, and are then led forward in the direction of the light-exiting optical axis after passing through about the center of the flash discharge tube 2, although not shown in FIG. 1, because the reflector 3 is of the form concentric with the flash discharge tube 2. The behavior of rays after returning to the center of the light source is the same as that described in the foregoing.

Next, the shape of the second light-transmissive optical member 5 will be described. The second light-transmissive optical member 5 is a plate-like member which is also usable as an exterior member of an electronic apparatus as it is, and is provided with, on the exit surface side thereof, three lens surfaces each having a positive refractive power. The lens surfaces of the second light-transmissive optical member 5 have such respective shapes as to be capable of varying, at respective constant rates, the degrees of light collection of light fluxes coming from the above mentioned three areas in total of the first light-transmissive optical member 4, i.e., the middle area, in which the light collection is effected by the lens of positive refractive power, and the upper and lower areas, in which the light collection is effected by reflection. Then, light fluxes coming from the three areas are subjected to the similar variation of light distribution depending on the separation between the first light-transmissive optical member 4 and the second light-transmissive optical member 5.

The middle lens surface of the second light-transmissive optical member 5 is formed as an aspheric cylindrical lens of the form such that, as shown in FIG. 1, light fluxes exiting from one point P are made approximately parallel with the light-exiting optical axis after being refracted by the exit surface 5a.

On the other hand, each of the upper and lower lens surfaces, which are located above and below the middle lens surface of the second light-transmissive optical member 5, is provided with the following correcting surface shape, because light fluxes after being reflected by the total-reflection surface of the first light-transmissive optical member 4 are not collected to one point. Each of the upper and lower lens surfaces has a shape having different characteristics between upper and lower portions thereof with the middle portion thereof taken as the boundary, in such a manner that all light fluxes after passing through the exit surface become components parallel with the light-exiting optical axis when the two light-transmissive optical members 4 and 5 are located away from each other at a predetermined distance. In other words, with a component parallel with the light-exiting optical axis in the middle portion or thereabout among all the reflection light components taken as the border, a lens portion located on the outer side of the border is formed as a lens surface having a weak refractive power, and a lens portion located on the inner side of the border is formed as a lens surface having a strong refractive power. With such a lens construction employed, it is possible to attain a most light-collected state, in which light fluxes are most collected as shown in FIG. 1, when the first light-transmissive optical member 4 and the second light-transmissive optical member 5 are located away from each other at a predetermined distance.

To control light fluxes and obtain the most light-collected state by utilizing the aperture area of the second light-transmissive optical member 5 up to the allowable maximum size is an important factor for realizing an illumination device capable of a large amount of light emission. By this arrangement, it is possible to attain an illumination optical system which is reduced in size and is excellent in illumination efficiency.

On the other hand, the light distribution characteristic showing the state in which light fluxes are most spread is obtained when the first light-transmissive optical member 4 and the second light-transmissive optical member 5 are located closest to each other, as shown in FIG. 2. In this instance, as is illustrated in the ray tracing diagram of FIG. 2, a plurality of most light-collected areas formed in front of the exit surface by the first light-transmissive optical member 4 almost coincide with the positions of the light-emitting optical axes of the respective lens surfaces on the illumination surface side of the second light-transmissive optical member 5, i.e., the middle portion or thereabout of each lens surface. Thus, with the most light-collected area of the first light-transmissive optical member 4 made to almost coincide with the portion around the optical axis of each lens surface of the second light-transmissive optical member 5, which is an area that is hardly affected by the refractive power of each lens surface, it is possible to cause the illumination device to illuminate an object with the distribution characteristic approximately equivalent to the light-collected state obtained by the first light-transmissive optical member 4. Accordingly, by arranging the optical system as described above and appropriately setting the predetermined light-collected state to be obtained by the first light-transmissive optical member 4 and the thickness of the second light-transmissive optical member 5, it becomes possible to obtain the light distribution characteristic in which the illumination range is widest correspondingly with the necessary illumination area for the photographic lens at the wide-angle side, and the light-collected state is even with a little loss of energy. As a condition in this instance, it is desirable that the shape of each portion of the first light-transmissive optical member 4 is set in such a manner as to make the light-collected states of the respective portions of the first light-transmissive optical member 4 almost coincident with each other.

In the first embodiment, the lens surfaces are formed on the illumination surface side. This arrangement is effective for reducing the size of the illumination optical system. In other words, the farther the light controlling surface from the light source, the more the light-collecting effect is heightened. Then, if the light-controlling surface is located farthest from the light source, it is possible to reduce the size of the optical system in the direction of the light-exiting optical axis.

One example of the light distribution characteristic obtained by the illumination device having the above construction is shown in FIG. 5. A broken polygonal line shown in FIG. 5 indicates the light distribution characteristic obtained when the photographic lens is in the telephoto state, which corresponds to the light distribution characteristic shown in FIG. 1. It is understood from FIG. 5 that the light distribution characteristic showing the even light distribution at a narrow angular range with respect to the necessary illumination angular range is obtained. In this case, while the state shown in FIG. 1 indicates that all the light fluxes are made parallel with the light-exiting optical axis, the actual light distribution characteristic shows a certain degree of spread due to the size of the light source itself, also causing illumination onto the outside of the necessary angle of view and leaving the skirts of the illumination range from the viewpoint of the light distribution characteristic. However, there is obtained the light distribution characteristic showing the even light distribution with a little loss of energy as a whole.

On the other hand, a solid polygonal line shown in FIG. 5 indicates the light distribution characteristic obtained when the photographic lens is in the wide-angle state, which corresponds to the light distribution characteristic shown in FIG. 2. It is understood from FIG. 5 that the light distribution characteristic showing the even light distribution at a wide angular range with respect to the necessary illumination angular range is obtained.

In the variable-illumination-angle illumination device according to the first embodiment, as described above, the variation of the illumination angle from the state in which the illumination range is widest as shown in FIG. 2 up to the state in which the illumination range is narrowest as shown in FIG. 1 can be continuously performed only by such a simple operation as to adjust the separation between the first light-transmissive optical member and the second light-transmissive optical member. Further, the light distribution characteristic showing the even light distribution can be obtained also at every zoom point between the wide-angle end and the telephoto end.

In particular, the characteristic features of the method according to the first embodiment are that the light distribution characteristic in the state in which the necessary illumination angle is wide correspondingly with the wide-angle state of the photographic lens is excellent, and the amount of movement required for varying the illumination angle is small as compared with the conventional method. The reason why the light distribution characteristic in the wide-angle state is excellent is that the first light-transmissive optical member is divided into a plurality of light-collected areas and the light distribution characteristics of the respective light-collected areas are made coincide with one another, and is that, when light fluxes the light distribution characteristic of which has been controlled by the first light-transmissive optical member pass through the second light-transmissive optical member, the light distribution characteristic of the light fluxes are controlled by such areas as to hardly affect the light distribution characteristic, i.e., areas having a weak refractive power. With such an arrangement adopted, it is possible to limit the loss of light toward the outside of the necessary illumination range to the necessary minimum, and, at the same time, it is possible to attain the even light distribution characteristic. In addition, the reason why the amount of movement is small is that an optical path is divided into a plurality of paths and an optical system is also divided into a plurality of small-sized optical systems corresponding to the respective paths, thereby enabling the required amount of movement for varying the illumination range to be reduced. Accordingly, it becomes possible to design an illumination optical system excellent in space efficiency and adapted for a small-sized photographing apparatus, and it is possible to construct the illumination optical system inexpensively without requiring a great number of additional constituent parts.

Incidentally, while, in the first embodiment, lens surfaces each having a positive refractive power are provided on the exit surface side of the second light-transmissive optical member so as to reduce the size thereof and to improve the illumination efficiency, the invention is not limited to such an arrangement. Instead, lens surfaces each having a positive refractive power may be provided on the entrance surface side of the second light-transmissive optical member. With this arrangement adopted, any unnecessary protrusion is provided on the appearance shape of an optical part, and the second light-transmissive optical member can be directly exposed to the outside as an exterior part, so that, in some cases, it is possible to reduce the size of the illumination device as compared with the case where an unnecessary protection member is additionally provided.

Further, it is not always necessary that lens surfaces each having a positive refractive power are formed only on one side of the second light-transmissive optical member, and lens surfaces each having a positive refractive power may be provided on both of the front and back sides of the second light-transmissive optical member. With refractive powers thus distributed to the two surfaces, the second light-transmissive optical member can be arranged to have the shape effective for both the optical performance and the size reduction.

Further, while, in the first embodiment, the reflective surface 4d of the first light-transmissive optical member has such a shape as to control light fluxes having passed through the first light-transmissive optical member to one light-collected area, the invention is not necessarily limited to such an arrangement. Instead, the reflective surface 4d may have such a shape as to form a plurality of light-collected areas. With the light-collected areas as subdivided, it becomes possible to reduce the amount of movement of the light-transmissive optical member for varying the illumination angle, and it becomes possible to attain the reduction in size of the illumination optical system.

By defining the shape of each light-transmissive optical member according to the above-mentioned method, it is possible to form a light-collecting optical system smallest in size and most excellent in the illumination efficiency while taking into consideration the heat generating condition of the light source.

Second Embodiment

The second embodiment of the invention is an example of modification in which the shapes of the first and second light-transmissive optical members according to the first embodiment are modified, and, in particular, optical paths for light fluxes to be controlled by the upper and lower total-reflection surfaces are improved.

Figure 6:
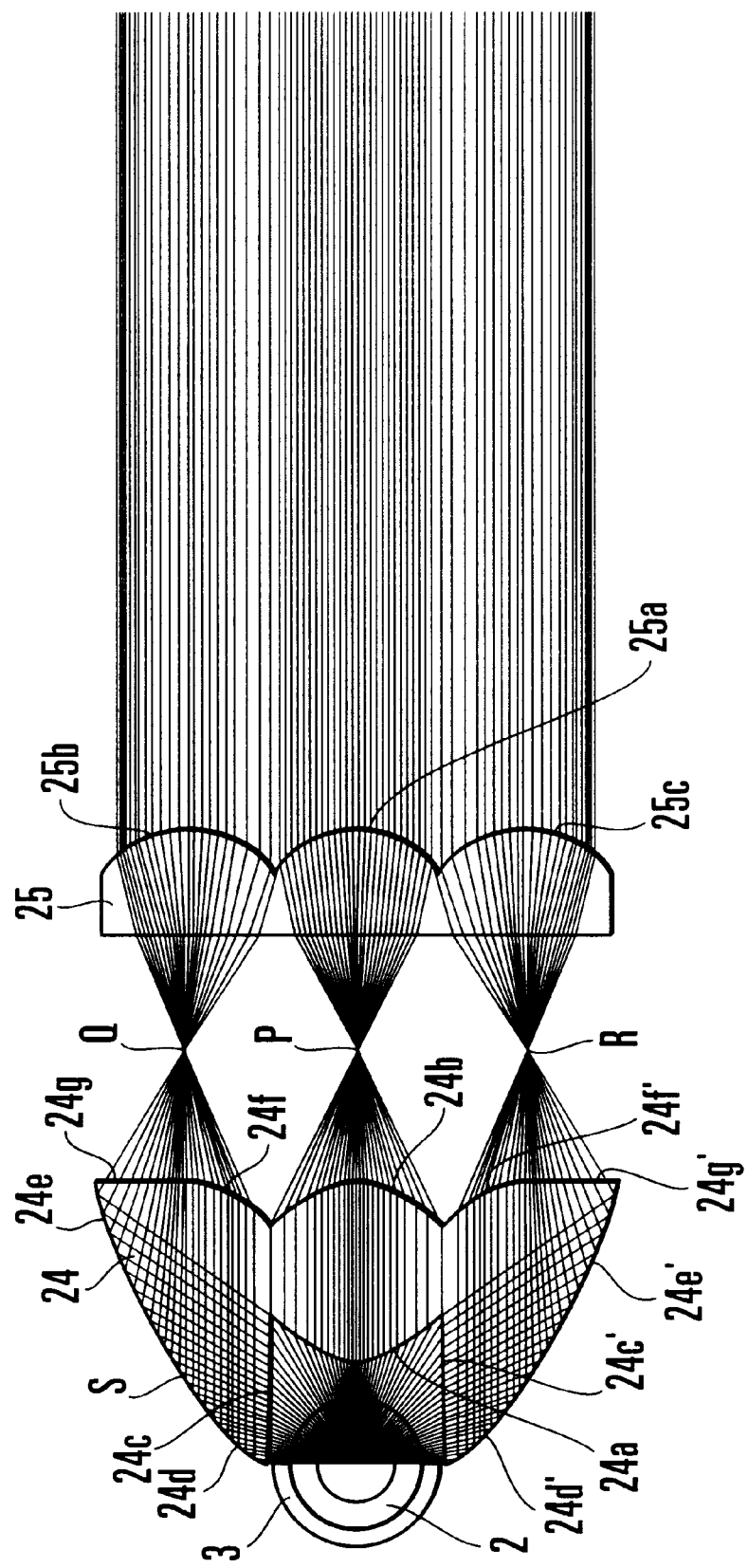
FIG. 6 is a vertical sectional view showing a flash light emitting device in a radial direction of a discharge tube when being set correspondingly with a narrow illumination range, according to a second embodiment of the invention.
Figure 7:
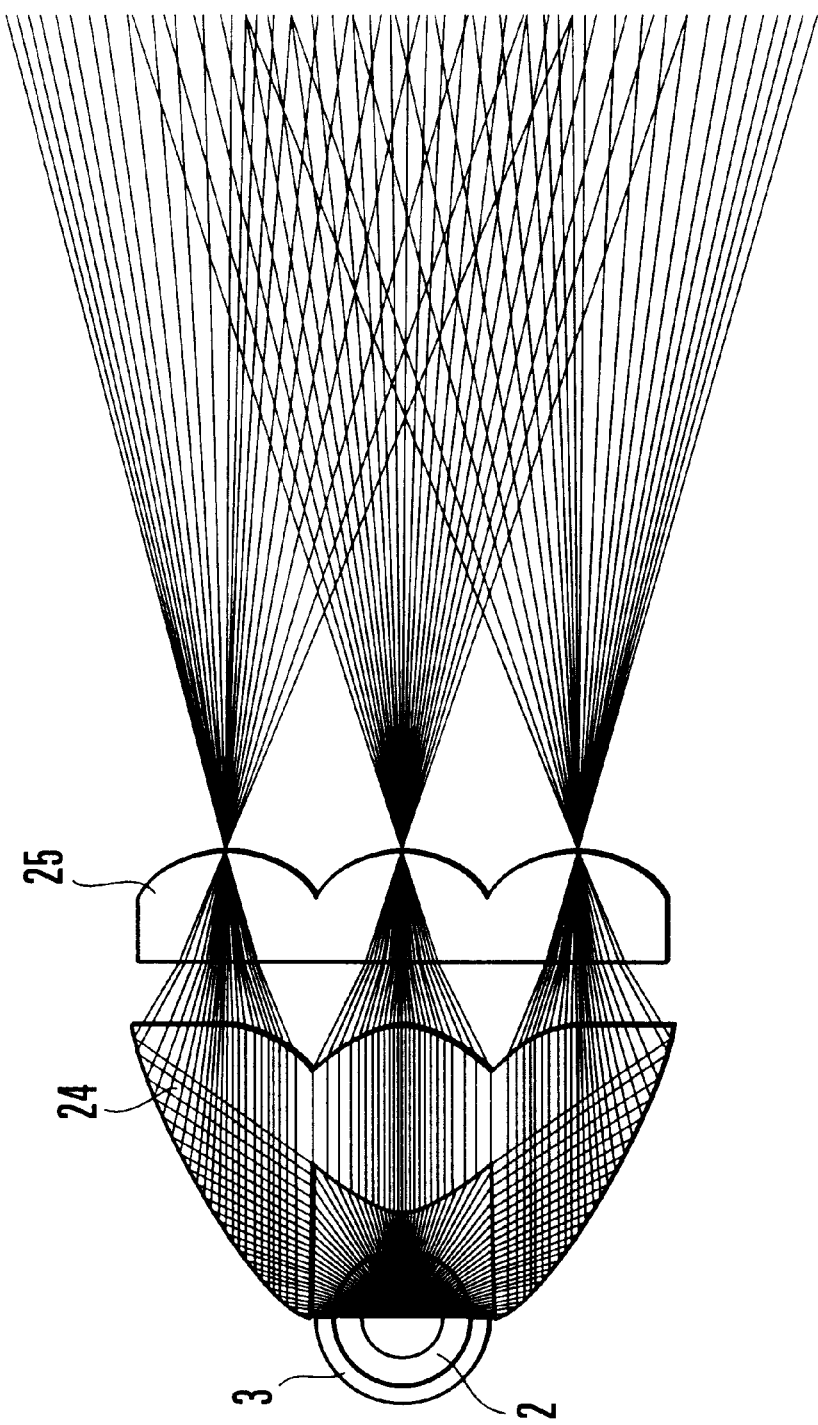
FIG. 7 is a vertical sectional view showing the flash light emitting device in the radial direction of the discharge tube when being set correspondingly with a wide illumination range, according to the second embodiment of the invention.

FIG. 6 shows the state in which the illumination range is narrowest with the two light-transmissive optical members located away from each other, and FIG. 7 shows the state in which the illumination range is widest with the two light-transmissive optical members located close to each other. In FIGS. 6 and 7, too, there are additionally illustrated ray tracing diagrams showing representative light fluxes emitted from the center of the light source, as in the first embodiment. FIG. 6 and FIG. 7 differ only in the separation between the two light-transmissive optical members, and show the same construction. Further, in FIGS. 6 and 7, the same parts as those described in the first embodiment are denoted by the same reference numerals as in FIGS. 1 and 2.

In FIGS. 6 and 7, reference numeral 24 denotes the first light-transmissive optical member. In the first light-transmissive optical member 24, light fluxes advancing in directions approximate to the light-exiting optical axis from the center of the light source are controlled for light collection by an entrance surface 24a and an exit surface 24b, similarly to the first embodiment.

Further, light components emitted in obliquely forward directions up to sideward directions from the center of the light source are made incident on an entrance surface 24c or 24c', are then reflected by one of reflective surfaces having different characteristics, i.e., a reflective surface 24d or 24d' located near the side of the light source and a reflective surface 24e or 24e' located near the side of the exit surface, and are then caused to exit from an exit surface 24g or 24g' of plane form located outside the center of the light-exiting optical axis or an exit surface 24f or 24f' of curved form located inside the center of the light-exiting optical axis.

Reference numeral 25 denotes the second light-transmissive optical member, being a plate-like optical member, in which three cylindrical lens surfaces 25a, 25b and 25c are formed on the exit surface side thereof. The three lens surfaces 25a, 25b and 25c have approximately the same lens shape, differently from those in the first embodiment.

The action of the variable-illumination-angle illumination device having the above construction according to the second embodiment will be described below.

First, the characteristic feature of the second embodiment is that the light-collected state of light fluxes caused to exit from the first light-transmissive optical member 24 is made to have approximately the same characteristic between an area located at the middle portion and controlled by refraction and an area located at the marginal portion and controlled by total reflection. The area located at the middle portion and controlled by refraction, i.e., an area controlled by the entrance surface 24a and the exit surface 24b, is of the same shape as that in the first embodiment.

On the other hand, the area located at the marginal portion and controlled by total reflection differs from that in the first embodiment in that the light control action in the portion outside the center of the light-exiting optical axis is different from that in the portion inside the center of the light-exiting optical axis, and light components caused to exit from the exit surface 24f or 24f' and light components caused to exit from the exit surface 24g or 24g' are collected to one point Q or R.

Since the characteristics of light fluxes caused to exit from the various portions of the first light-transmissive optical member 24 are approximately coincident with one another, the shapes of the various portions of the second light-transmissive optical member 25, which follows the first light-transmissive optical member 24, can be dealt with in the same manner. Therefore, the shape of the second light-transmissive optical member 25 can be made simple, and a plurality of optical members into which a light-collecting optical system is divided can be easily matched with one another.

Next, the method of controlling rays of total-reflection components by the first light-transmissive optical member 24 will be described.

Light fluxes entering at the entrance surface 24c advance to the total-reflection surfaces after being refracted. The shapes of the total-reflection surfaces are decided essentially in such a way that light components S located approximately at the central portion are made parallel with the light-exiting optical axis and light components located outside the components S are collected to one point Q by the total-reflection surface 24e and the exit surface 24g.

In particular, in the case of the second embodiment, the total-reflection surface 24e is made to have such a light-collecting function, and the exit surface 24g is composed of a plane surface.

On the other hand, light components located inside the components S located approximately at the central portion are once converted into light fluxes parallel with the light-exiting optical axis by the reflective surface 24d, and are then refracted by the exit surface 24f in such a way as to be collected to one point Q. With this arrangement adopted, the reflected components are caused to exit from approximately the whole area of the exit surfaces 24f and 24g without causing exiting components having different angles to occur at the same point of the exit surface, and are then collected to one point Q. Therefore, it is possible to control the light distribution easily and efficiently.

Further, since the surface shape of the total-reflection surface 24e, which is located at the outermost portion, is arranged to reflect light fluxes inward, the whole shape of the first light-transmissive optical member 24 can be kept small-sized.

With the above construction adopted, as shown in FIG. 6, light fluxes after exiting from the first light-transmissive optical member 24 are made to form most light-collected areas, each extending in the direction perpendicular to the drawing plane of FIG. 6, at the points P, Q and R which are approximately at the same distance in the light-exiting optical axis from the first light-transmissive optical member 24, and the second light-transmissive optical member 25 is disposed at a predetermined distance from the position of the points P, Q and R, so that the most light-collected state of the illumination optical system can be attained.

On the other hand, in the state shown in FIG. 7, the first light-transmissive optical member 24 is moved toward the second light-transmissive optical member 25, so that the most light-collected points are made to coincide with the lens surfaces on the exit surface side of the second light-transmissive optical member 25. With the first light-transmissive optical member 24 moved up to such a position, it is possible to limit, to the minimum, the influence of refraction by the lens surfaces on the exit surface side of the second light-transmissive optical member 25, so that illumination can be performed without changing the light distribution characteristic obtained by the first light-transmissive optical member 24 showing the good light distribution in which light fluxes are spread to a predetermined extent.

Further, in the intermediate state between the states shown in FIGS. 6 and 7, the light-collected state can be gradually varied according to the moving distance of the first light-transmissive optical member 24, and the light distribution characteristic showing the even light distribution at every point in the process of movement is maintained, so that it is possible to realize an excellent variable-illumination-angle illumination device. In addition, since, similarly to the first embodiment, lens surfaces are formed on the exit surface side of the second light-transmissive optical member 25, the length in the optical axis direction of the illumination optical system can be shortened. Further, since light fluxes are refracted twice, i.e., by the entrance surface and the exit surface, it is possible to limit, to the minimum, the loss in amount of light caused by surface reflection. Accordingly, it is possible to attain a variable-illumination-angle illumination optical system having the very advantageous construction.

Third Embodiment

In a third embodiment of the invention, a part of each of the first and second light-transmissive optical members in the second embodiment is changed from the convex lens shape to the Fresnel lens shape. This arrangement makes it possible to reduce the size of the entire optical system shape and to simplify the shape of each exit surface. The other elements of the third embodiment are similar to those of the second embodiment, and, in FIGS. 8 and 9, parts corresponding to those in the second embodiment are denoted by the same reference numerals as in FIGS. 6 and 7.

Figure 8:
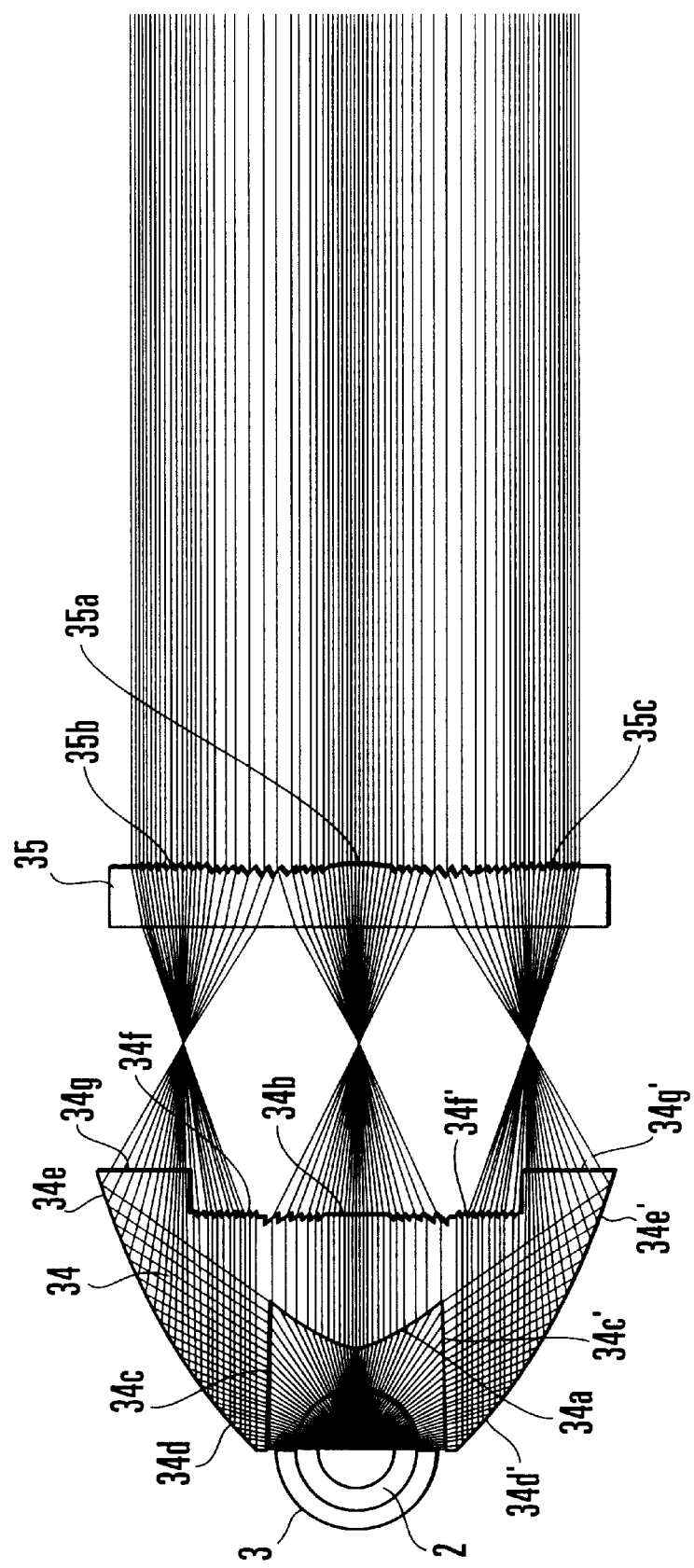
FIG. 8 is a vertical sectional view showing a flash light emitting device in a radial direction of a discharge tube when being set correspondingly with a narrow illumination range, according to a third embodiment of the invention.
Figure 9:
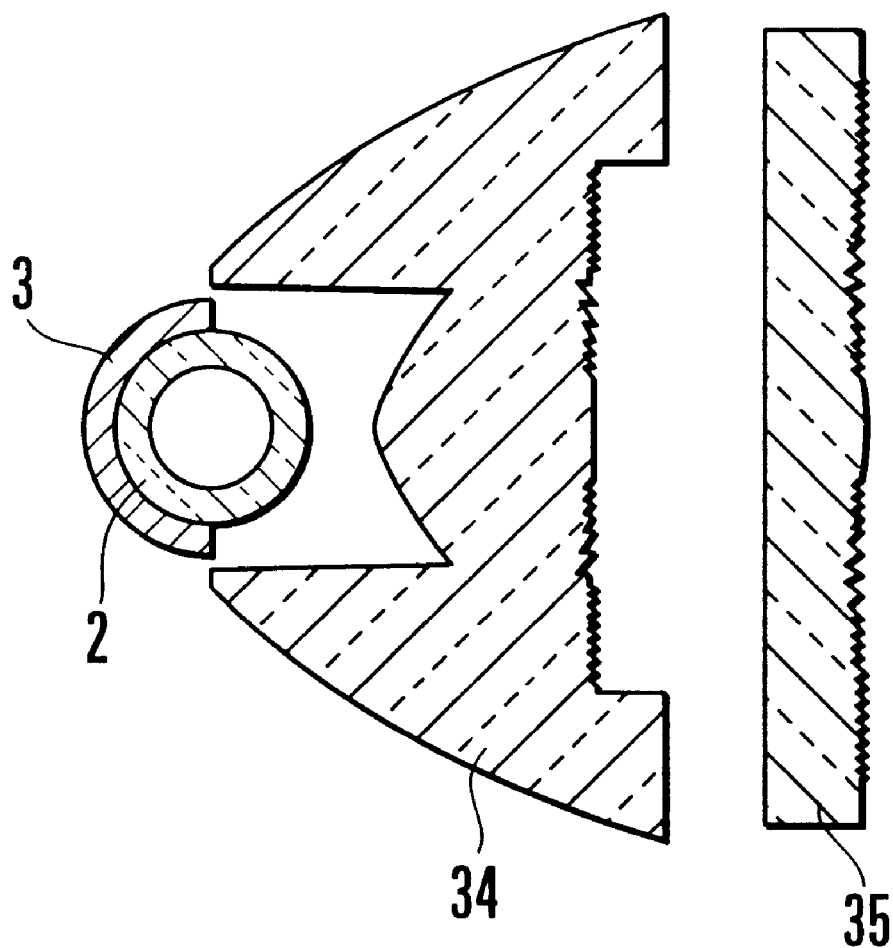
FIG. 9 is a vertical sectional view showing the flash light emitting device in the radial direction of the discharge tube when being set correspondingly with a wide illumination range, according to the third embodiment of the invention.

FIG. 8 shows the state in which the illumination range is narrowest with the two light-transmissive optical members located away from each other, and FIG. 9 shows the state in which the illumination range is widest with the two light-transmissive optical members located close to each other. In FIG. 8, too, there is additionally illustrated a ray tracing diagram showing representative light fluxes emitted from the center of the light source, as in the first embodiment. On the other hand, FIG. 9 shows only the shapes and arrangement of the two light-transmissive optical members and does not show a ray tracing diagram. However, a ray tracing diagram which is approximately equivalent to the state shown in FIG. 7 in the second embodiment is applied to FIG. 9. It is to be noted that FIG. 8 and FIG. 9 differ only in the separation between the two light-transmissive optical members, and show the same construction.

In FIGS. 8 and 9, reference numeral 34 denotes the first light-transmissive optical member. In the first light-transmissive optical member 34, light fluxes advancing in directions approximate to the light-exiting optical axis from the center of the light source are controlled for light collection by an entrance surface 34a composed of a cylindrical lens and an exit surface 34b composed of a Fresnel lens.

Further, light components emitted in obliquely forward directions up to sideward directions from the center of the light source are made incident on an entrance surface 34c or 34c', are then reflected by one of reflective surfaces having different characteristics, i.e., a reflective surface 34d or 34d' located near the side of the light source and a reflective surface 34e or 34e' located near the side of the exit surface, and are then caused to exit from an exit surface 34g or 34g' of plane form located outside the center of the light-exiting optical axis or an exit surface 34f or 34f' composed of a Fresnel lens surface located inside the center of the light-exiting optical axis.

Reference numeral 35 denotes the second light-transmissive optical member, being a plate-like optical member, in which three Fresnel lens surfaces 35a, 35b and 35c are formed on the exit surface side thereof. The three lens surfaces 35a, 35b and 35c are composed of Fresnel lens surfaces, differently from those in the second embodiment.

The characteristic feature of the third embodiment is that a part of the optical system in the second embodiment is replaced with a Fresnel lens. The structural arrangement of each of the light-transmissive optical members and the conditions, such as the amount of movement, in the third embodiment are exactly the same as those in the second embodiment, and the ray tracing diagram employed in the third embodiment is approximately equivalent to that in the second embodiment. The details of the operation of the illumination device according to the third embodiment are omitted from the description so as to avoid the duplicate description of the second embodiment.

With a part of the lens surface formed as a Fresnel lens as described above, it is possible to simplify the shape of the exit surface side, so that the lens surface can be easily handled as an exterior part of an optical apparatus or the like. In addition, it is possible to thin the second light-transmissive optical member, so that the size of the entire shape of an illumination optical system can be reduced.

On the other hand, if a part of the lens surface is formed as a Fresnel lens, Fresnel edge portions of the lens surface would cause unnecessary refracted light or unnecessary totally-reflected light, thereby degrading the illumination efficiency. However, in the case of an illumination optical system in the third embodiment, a range of directions to be controlled at the individual points of the exit surface is considerably narrowed by the light-deflecting operation of the first light-transmissive optical member, and light fluxes to be led to the Fresnel edge portions become few as compared with the case of an illumination optical system using the conventional Fresnel lens. Therefore, it is possible to keep the loss in amount of light low.

While, in the third embodiment, Fresnel lens surfaces are formed on a part of the exit surface of the first light-transmissive optical member and the exit surface of the second light-transmissive optical member, the position of the Fresnel lens surface is not limited to such positions. For example, the entrance surface 34a, which is located at the middle portion of the first light-transmissive optical member, may be formed as a Fresnel lens surface, or the exit surface of the first light-transmissive optical member, which does not appear as an exterior part, may be formed as a convex lens surface, as in the second embodiment, with the illumination efficiency given priority. Thus, any element having a surface of positive refractive power in the arrangement of the second embodiment may be replaced with a Fresnel lens surface.

Fourth Embodiment

Figure 10:
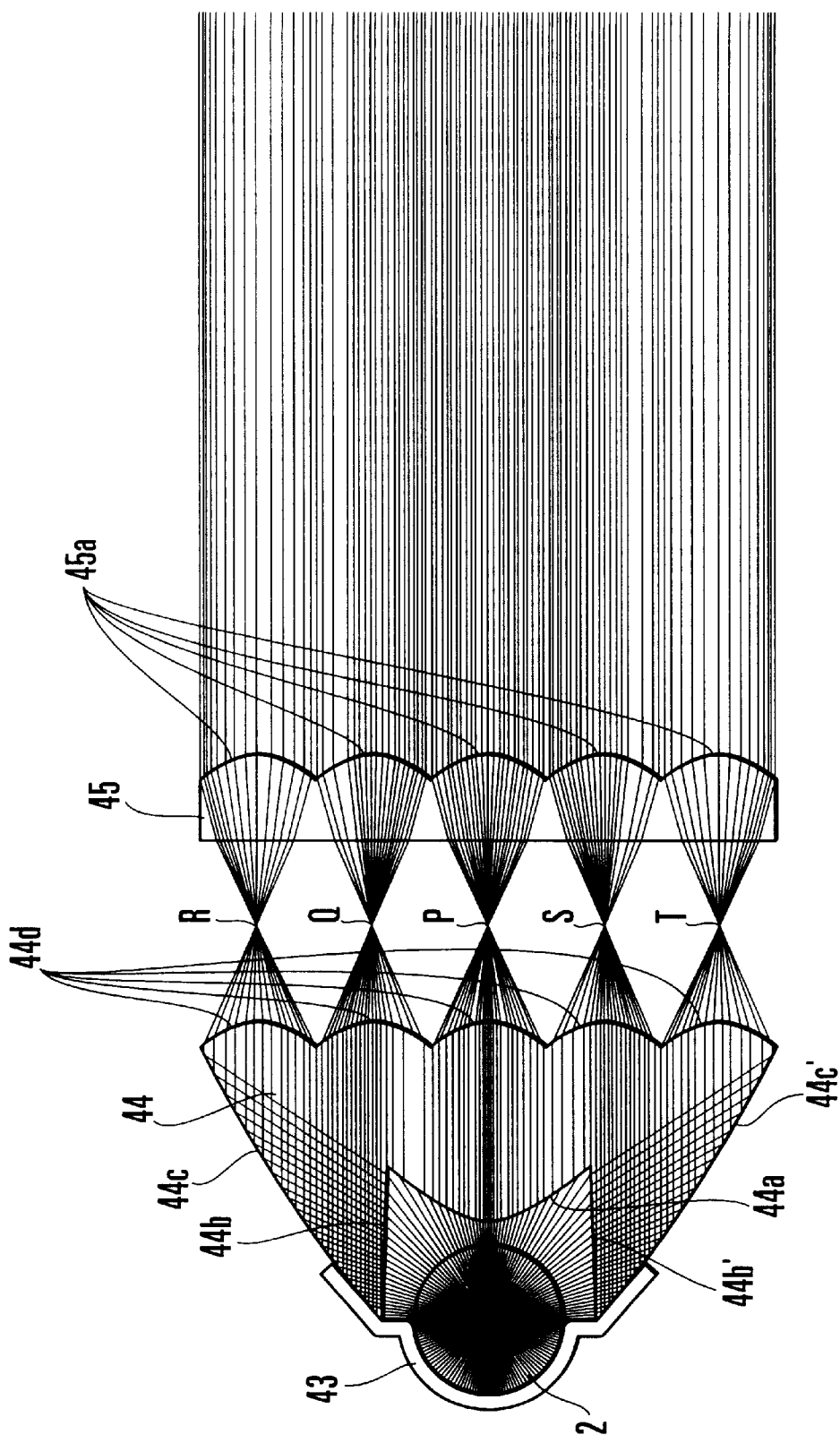
FIG. 10 is a vertical sectional view showing a flash light emitting device in a radial direction of a discharge tube when being set correspondingly with a narrow illumination range, according to a fourth embodiment of the invention.
Figure 11:
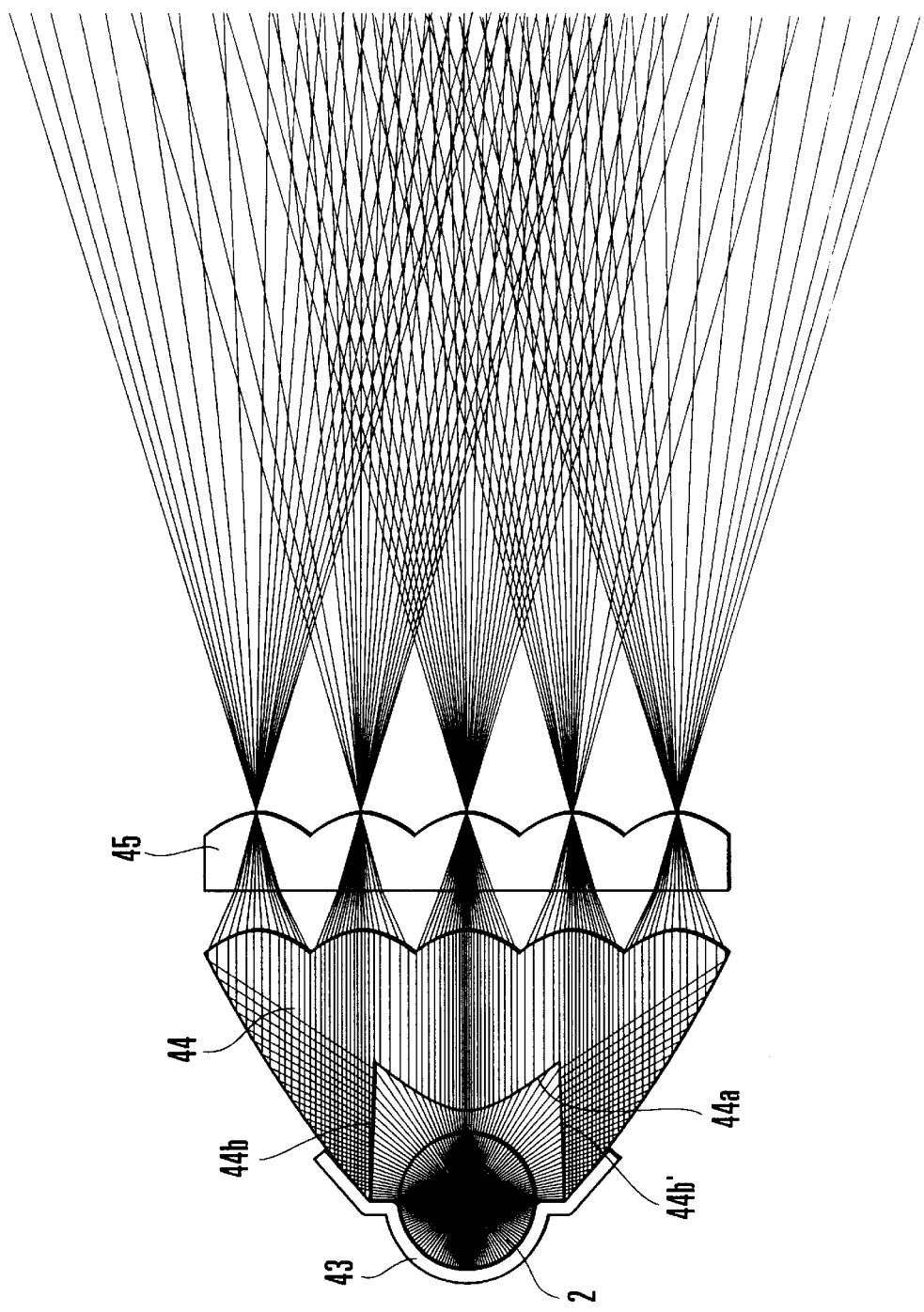
FIG. 11 is a vertical sectional view showing the flash light emitting device in the radial direction of the discharge tube when being set correspondingly with a wide illumination range, according to the fourth embodiment of the invention.

In a fourth embodiment of the invention, the shapes of the first and second light-transmissive optical members in the first embodiment are modified. In particular, the fourth embodiment is characterized in that the number of light-collected areas formed behind the first light-transmissive optical member is increased to five. FIG. 10 shows the state in which the illumination range is narrowest with the two light-transmissive optical members located away from each other, and FIG. 11 shows the state in which the illumination range is widest with the two light-transmissive optical members located close to each other. In FIGS. 10 and 11, too, there are additionally illustrated ray tracing diagrams showing representative light fluxes emitted from the center of the light source, as in the first embodiment. FIG. 10 and FIG. 11 differ only in the separation between the two light-transmissive optical members, and show the same construction. Further, in FIGS. 10 and 11, the same parts as those described in the first embodiment are denoted by the same reference numerals as in FIGS. 1 and 2.

In FIGS. 10 and 11, reference numeral 43 denotes a reflector arranged to reflect light components advancing backward among light fluxes emitted from the flash discharge tube 2. The reflector 43 is made of such a material as to make an inner surface thereof have a high reflectance.

Reference numeral 44 denotes the first light-transmissive optical member, which is arranged to cause light fluxes emitted from the center of the light source to be refracted at an entrance surface 44a or be reflected at a reflective surface 44c or 44c' after being refracted at an entrance surface 44b or 44b', then to be made parallel with the light-exiting optical axis, and then to be divided into five light-collected areas at exit surfaces 44d. Further, in rear of the first light-transmissive optical member 44, there is disposed the second light-transmissive optical member 45, which has, on the exit side thereof, lens surfaces 45d of positive refractive power, the number of which corresponds to the number of light-collected areas formed by the first light-transmissive optical member 44.

The characteristic feature of the fourth embodiment is that such an arrangement can be adopted as to divide a light-collected state of light fluxes exiting from the first light-transmissive optical member into an arbitrary number of areas, instead of dividing the light-collected area into three areas, i.e., a refraction area at the middle portion and total-reflection areas at the upper and lower portions, as in the above first to third embodiments. With the number of divided areas increased, it is possible to reduce the size of an individual light-collecting lens. Therefore, it is possible to limit the amount of movement of an optical member for varying the illumination angle to a minimum value, thereby giving an advantage in designing a moving mechanism.

The operation of the variable-illumination-angle illumination device according to the fourth embodiment will be described below.

The reflector 43 has a reflective surface of semicylindrical form concentric with the flash discharge tube 2 and a reflective surface extending up to a rear portion of the total-reflection surface of the first light-transmissive optical member 44. Thus, a rear portion of the reflector 43 is of the semicylindrical form concentric with the flash discharge tube 2, as in the first embodiment. This form is defined for handling light fluxes advancing toward the reflector 43 in the same manner as light fluxes advancing directly forward from the flash discharge tube 2, and is adapted for reducing the size of the entire shape of the optical system. On the other hand, the reason why a portion of the reflector 43 following the semicylindrical portion thereof is formed to extend over a part of the first light-transmissive optical member is to prevent the loss in amount of light from occurring such that, while a light emitting part of the flash discharge tube 2 has a certain finite size, some light fluxes among light fluxes emitted from the front side of the center of the light source, i.e., from the side close to the exit surface, would exit from the total-reflection surface 44c without being totally reflected by the total-reflection surface 44c. The shape of such a reflecting portion of the reflector 43 is made approximately analogous to and slightly larger than the shape of the total-reflection surface 44c, so that light fluxes which have reentered the first light-transmissive optical member 44 are also effectively controlled for light distribution. Accordingly, it is possible to form an illumination optical system excellent in illumination efficiency.

Next, the method of light control by the first light-transmissive optical member 44 will be described on the basis of the behavior of light fluxes emitted from the center of the light source. Light components having small angles with respect to the light-exiting optical axis are made parallel with the light-exiting optical axis by the refractive surface 44a, in the same manner as in the first to third embodiments. On the other hand, light components to be controlled for total reflection are once refracted by the entrance surface 44b or 44b', and are then totally reflected by the total-reflection surface 44c or 44c' to be converted into components approximately parallel with the light-exiting optical axis. Further, light fluxes advancing toward the reflector 43 are reflected by the reflector 43 fundamentally without being affected by the flash discharge tube 2 because the reflector 3 is of the form concentric with the flash discharge tube 2, are then caused to again pass through the center of the flash discharge tube 2, and are then made approximately parallel with the light-exiting optical axis via the refractive surface 44a or the total-reflection surface 44c or 44c'. Thus, light fluxes emitted from the center of the light source are fundamentally made parallel with the light-exiting optical axis in respect of the section of the first light-transmissive optical member 44.

The exit surfaces 44d of the first light-transmissive optical member 44 are five light-collected areas having the same refractive power, and are arranged to make the respective light-collected points P, Q, R, S and T exist on one and the same plane. With the degrees of light collection made constant and the most light-collected points made to exist on one and the same plane, as described above, the illumination-angle varying operation can be performed approximately in the same manner at the respective areas, which is advantageous.

In addition, in rear of the first light-transmissive optical member 44, there is disposed the second light-transmissive optical member 45. The second light-transmissive optical member 45 is provided with, on the exit side thereof, light-collecting lens surfaces 45a, the number of which corresponds to the number of the light-collected areas formed by the first light-transmissive optical member 44, and which are disposed at such positions that light components collected in rear of the first light-transmissive optical member 44 are spread to a maximum degree without intersecting each other. Such a state is shown in FIG. 10.

FIG. 11 shows a state in which the first light-transmissive optical member 44 and the second light-transmissive optical member 45 are located close to each other. With the first light-transmissive optical member 44 and the second light-transmissive optical member 45 located as shown in FIG. 11, it is possible to widen the illumination range, and it is possible to obtain the light distribution characteristic showing the even light distribution.

Further, also in the intermediate state between the states shown in FIGS. 10 and 11, the illumination angle can be continuously varied. In this instance, also, the light distribution characteristic can be varied while keeping the even light distribution.

While, in the fourth embodiment, the number of light-collected areas formed in rear of the first light-transmissive optical member 44 is five, the invention is not necessarily limited to this number. Instead, the number of light-collected areas as divisionally provided may be an arbitrary number according to a space available for an illumination-angle varying mechanism.

Further, while, in the fourth embodiment, all the lens shapes of the five exit surfaces 44d of the first light-transmissive optical member 44 are the same, and all the lens shapes of the five exit surfaces 45a of the second light-transmissive optical member 45 are the same, the invention is not necessarily limited to such an arrangement. Instead, the lens shapes of the individual exit surfaces 44d or 45a may be changed to have varied sizes or varied refractive powers. Further, while, in the fourth embodiment, the lens surfaces of the second light-transmissive optical member 45 are formed on the exit side thereof, the invention is not necessarily limited to such an arrangement. Instead, for example, a part of plural lens surfaces may be formed on the side near to the light source, or a part of plural lens surfaces may be replaced with a Fresnel lens, similarly to the third embodiment.

Fifth Embodiment

Figure 12:
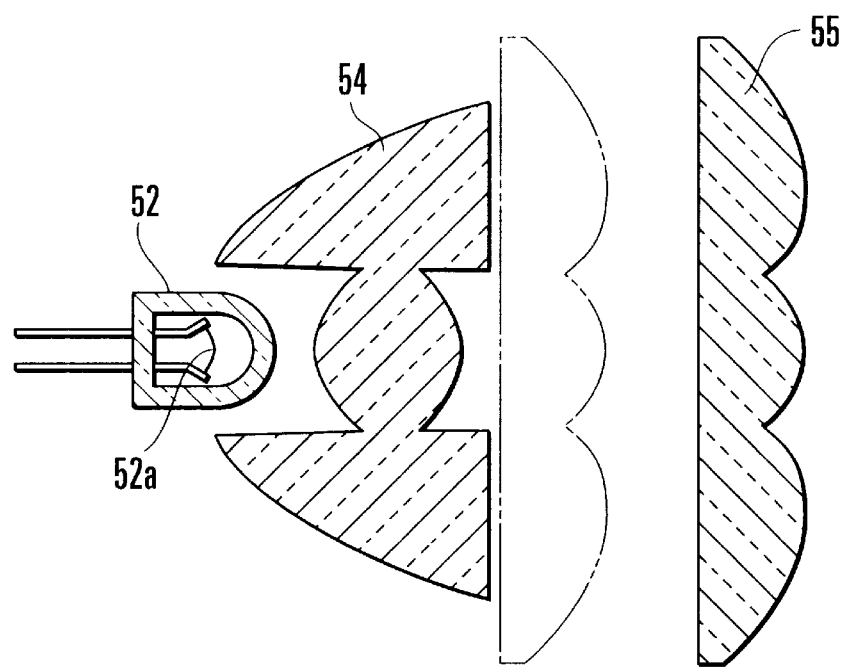
FIG. 12 is a vertical sectional view showing the optical arrangement of an illumination optical system according to a fifth embodiment of the invention.
Figure 13:
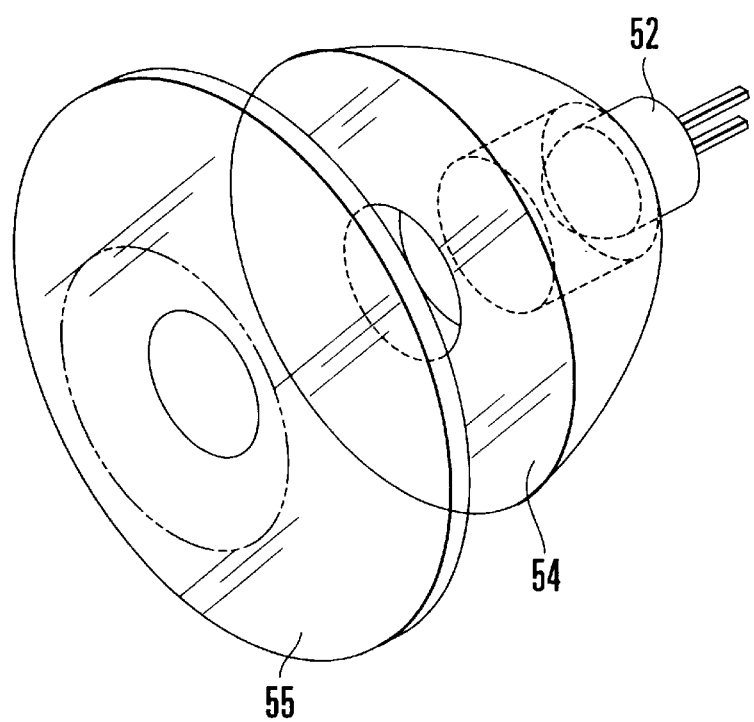
FIG. 13 is a perspective view showing essential parts of the illumination optical system according to the fifth embodiment of the invention.

In the case of a fifth embodiment of the invention, the light source is such a small light source that can be regarded as a point light source. FIG. 12 is a vertical sectional view showing an illumination optical system according to the fifth embodiment. FIG. 13 is a perspective view showing the illumination optical system according to the fifth embodiment.

For example, a high-luminance LED (light-emitting diode) used for a red-eye preventing lamp, a self-timer lamp or the like for use with a camera or the like corresponds to a light source close upon the point light source. An illumination device, such as a red-eye preventing lamp or a self-timer lamp, to which the fifth embodiment is applied is desired to be capable of saving energy by changing the illumination range according to a photographic lens of the camera. Accordingly, such a kind of arrangement as to be capable of varying the illumination angle is extremely effective.

In a case where the above kind of light source is used, the invention is applicable by replacing the shape of each element in each of the first to fourth embodiments with the shape of rotational symmetry. In the case of the fifth embodiment, the shape of each element in the first embodiment is converted into the rotationally-symmetrical shape.

In the fifth embodiment shown in FIG. 12, a lamp is used as the light source. Reference numeral 52 denotes the lamp serving as the light source, which emits light from a filament 52a. Reference numeral 54 denotes a first light-transmissive optical member, and reference numeral 55 denotes a second light-transmissive optical member. As is understandable also from FIG. 13, every member is formed into the rotationally-symmetrical shape.

In FIG. 12, the position of the second light-transmissive optical member 55 indicated by a solid line is an optical arrangement representing the state in which light fluxes are most collected (the most light-collected state). On the other hand, the position of the second light-transmissive optical member 55 indicated by a two-dot chain line in FIG. 12 is an optical arrangement representing the state for obtaining the wide illumination range.

The actual illumination-angle varying operation is performed by changing the amount of movement between the above-mentioned two states, so that it becomes possible to continuously vary the light distribution characteristic. In particular, in a case where an optical system is of the rotationally-symmetrical shape, since it is possible to vary the light distribution characteristic in respect of the sectional shape in every direction, the light-collecting effect is large, and a variation to a large degree of light collection can be expected. A ray tracing diagram showing the light-collected state of rays is the same as that in the first embodiment, and is, therefore, omitted from the description here.

In a case where the point light source is selected as the light source, as mentioned above, since the light emitting portion is limited only to the portion of a filament, it is possible to control light fluxes with ease, and it is possible to considerably decrease the loss in amount of light. Accordingly, it is possible to form an illumination optical system excellent in illumination efficiency.

As has been described in the foregoing, according to the invention, the size of a light-collecting optical system serving as the base of a variable-illumination-angle illumination optical system is reduced as much as possible, and the amount of movement required for varying the illumination angle is decreased as compared with that in the conventional arrangement. Accordingly, it is possible to extremely reduce the size of the whole illumination optical system, so that the illumination optical system can be mounted on the various optical apparatuses.

Further, it is possible to provide a variable-illumination-angle illumination device excellent in optical characteristic in such a manner that the light distribution characteristic can be continuously changed, and the even light distribution can be obtained at every zoom point.

Further, in a variable-illumination-angle illumination optical system according to the invention, the degree of freedom in design is high, and it is possible to easily design an illumination-angle varying mechanism which is optimum according to the size, mechanical precision, optical characteristic, etc., required as products.

Further, the number of constituent elements is so small as to enable an illumination-angle varying mechanism to be manufactured at low cost, and the light-collecting optical system is widely applicable to the various illumination optical systems, thereby providing extremely high general-purpose technical art.

On the other hand, since light collection within an optical prism is performed by utilizing total reflection, the efficiency of utilization of energy with respect to the same light source is high. Accordingly, even if the size of an illumination device is reduced, the optical characteristic is not lowered, and, instead, it is possible to increase effective energy to be emitted to the inside of a field of view.

What is claimed is:

1. An illumination device, comprising:

a light source; and a first optical unit arranged to direct light from said light source to an object, wherein said first optical unit has a lens part disposed a middle portion of said first optical unit and having such an optical power that each of both lens surfaces thereof has a positive refractive power to cause diverging light from said light source to exit in a light-collected state, and reflective surfaces disposed on both sides of said lens part and arranged to reflect light from said light source toward the object, and wherein said first optical unit further has exit surfaces disposed on both sides of said lens part and arranged to cause the light reflected by said reflective surfaces to exit, the light caused to exit being in the light-collected state, and wherein said first optical unit further has a plurality of convex lens surfaces provided on the object side of the light ejection surface of said first optical unit other than the lens part.

2. An illumination device according to claim 1, further comprising a second optical unit having a plurality of positive lens parts of positive refractive power corresponding respectively to light fluxes exiting from said lens part and said reflective surfaces.

3. An illumination device according to claim 2, wherein an illumination angle is varied by varying a relative interval between said first optical unit and said second optical unit.

4. An illumination device according to claim 1, wherein said light source is a discharge tube of cylindrical form.

5. An illumination device according to claim 4, further comprising a reflector disposed on a side of said discharge tube opposite to the object and arranged to return light emitted from said discharge tube toward a light-emitting source of said discharge tube.

6. An illumination device according to claim 4, wherein said first optical unit is lengthwise in a longitudinal direction of said discharge tube.

7. An illumination device according to claim 4, wherein said lens part of said first optical unit is of cylindrical form.

8. An illumination device according to claim 1, wherein each of said reflective surfaces is arranged to totally reflect light.

9. A camera having an illumination device according to claim 1 mounted thereon.

10. An illumination device according to claim 1 wherein, said light collected state is a state which promotes the light exiting from said lens part crossing over near an optical axis of said lens part.

11. An illumination device, comprising:

a light source;

a first optical unit arranged to direct light from said light source to an object, wherein said first optical unit has a lens part disposed a middle portion of said first optical unit and having such an optical power tat each of both lens surfaces thereof has a positive refractive power to cause diverging light from said light source to exit in a light-collected state, and reflective surfaces disposed on both sides of said lens part and arranged to reflect light from said light source toward the object; and a second optical unit disposed on a side nearer to the object than said first optical unit and having plurality of lens parts, wherein said first optical unit further has exit surfaces disposed on both sides of said lens part and arranged to cause the light reflected by said reflective surfaces to exit, the light caused to exit being in the light-collected state, and wherein said plurality of lens parts of said second optical unit are disposed in such a manner as to correspond respectively to light fluxes exiting from said lens part and said reflective surfaces of said first optical unit, and wherein said first optical unit further has a plurality of convex lens surfaces provided on the object side of the light ejection surface of said first optical unit other than the lens part.

12. An illumination device according to claim 11, wherein an illumination angle is varied by varying a relative interval between said first optical unit and said second optical unit.

13. An illumination device according to claim 11, wherein said light source is a discharge tube of cylindrical form.

14. An illumination device according to claim 13, further comprising a reflector disposed on a side of said discharge tube opposite to the object and arranged to return light emitted from said discharge tube toward a light-emitting source of said discharge tube.

15. An illumination device according to claim 13, wherein said first optical unit is lengthwise in a longitudinal direction of said discharge tube.

16. An illumination device according to claim 13, wherein said lens part of said first optical unit is of cylindrical form.

17. An illumination device according to claim 11, wherein each of said reflective surfaces is arranged to totally reflect light.

18. A camera having an illumination device according to claim 11 mounted thereon.

19. An illumination device according to claim 11 wherein, said light collected state is a state which promotes the light exiting from said lens part crossing over near an optical axis of said lens part.

* * * * *

UNITED STATES PATENT AND TRADEMARK OFFICE
CERTIFICATE OF CORRECTION

PATENT NO. : 6,575,582 B2 Page 1 of 1
DATED : June 10, 2003
INVENTOR(S) : Yoshiharu Tenmyo It is certified that error appears in the above-identified patent and that said Letters Patent is hereby corrected as shown below:

<u>Column 22,</u>
Line 18, delete "tat" and insert -- that --.

Signed and Sealed this

Twenty-first Day of October, 2003

JAMES E. ROGAN
*Director of the United States Patent and Trademark Office*